United States Patent [19]

Le Maigat

[11] Patent Number: 5,513,486
[45] Date of Patent: May 7, 1996

[54] METHOD AND DEVICE FOR DESTROYING BANANA PLANTATION DEBRIS

[75] Inventor: Rene Le Maigat, Gosier, France

[73] Assignee: Societe de Construction Metallique et de Commerce, Baie-Mahault, France

Related U.S. Application Data

[63] Continuation-in-part of PCT/FR93/00510 May 25, 1993.

[21] Appl. No.: 345,627

[22] Filed: Nov. 28, 1994

[30] Foreign Application Priority Data

May 26, 1992 [FR] France .................................. 92 06662
Feb. 15, 1993 [FR] France .................................. 93 02014

[51] Int. Cl.⁶ .......................... A01D 34/64; A01D 34/76
[52] U.S. Cl. ................. 56/503; 56/DIG. 17; 56/DIG. 20
[58] Field of Search ........................... 56/503, 17.5, 255, 56/295, 500, 504, DIG. 1, DIG. 17, DIG. 20

[56] References Cited

U.S. PATENT DOCUMENTS

| | | |
|---|---|---|
| 3,246,458 | 4/1986 | Shredder . |
| 3,925,969 | 12/1975 | Shunichi .................................. 56/13.9 |
| 4,384,444 | 5/1983 | Rossler, Jr. ............................. 56/503 X |
| 4,397,136 | 8/1983 | McLeod ................................. 56/503 X |
| 4,459,796 | 7/1984 | Stokes .................................... 56/500 X |
| 4,690,224 | 9/1987 | Shwez ........................................ 172/45 |
| 4,860,808 | 8/1989 | Le Clerc De Bussy ................ 144/335 |

FOREIGN PATENT DOCUMENTS 0-308-303  3/1989  European Pat. Off. .

*Primary Examiner*—Terry Lee Melius
*Attorney, Agent, or Firm*—Oliff & Berridge

[57] ABSTRACT

A machine for cutting and mulching banana plantation debris includes a self-propelled tractor mechanism having at least two driven wheels and at least one steerable wheel. The tractor mechanism forces banana plantation debris below the tractor mechanism as the tractor mechanism is driven. A cutting assembly is hitchable to a front or rear end of the tractor mechanism and connectable to a power take-off of the tractor mechanism. The cutting assembly as a tunnel chassis having an upside down U-shaped cross section that supports an inertial cutting and crushing mechanism. The tunnel chassis includes a substantially vertical shaft that mounts an inertial flywheel and, below the inertial flywheel, a mounting plate for rotatably mounting a plurality of cutting blades.

22 Claims, 7 Drawing Sheets

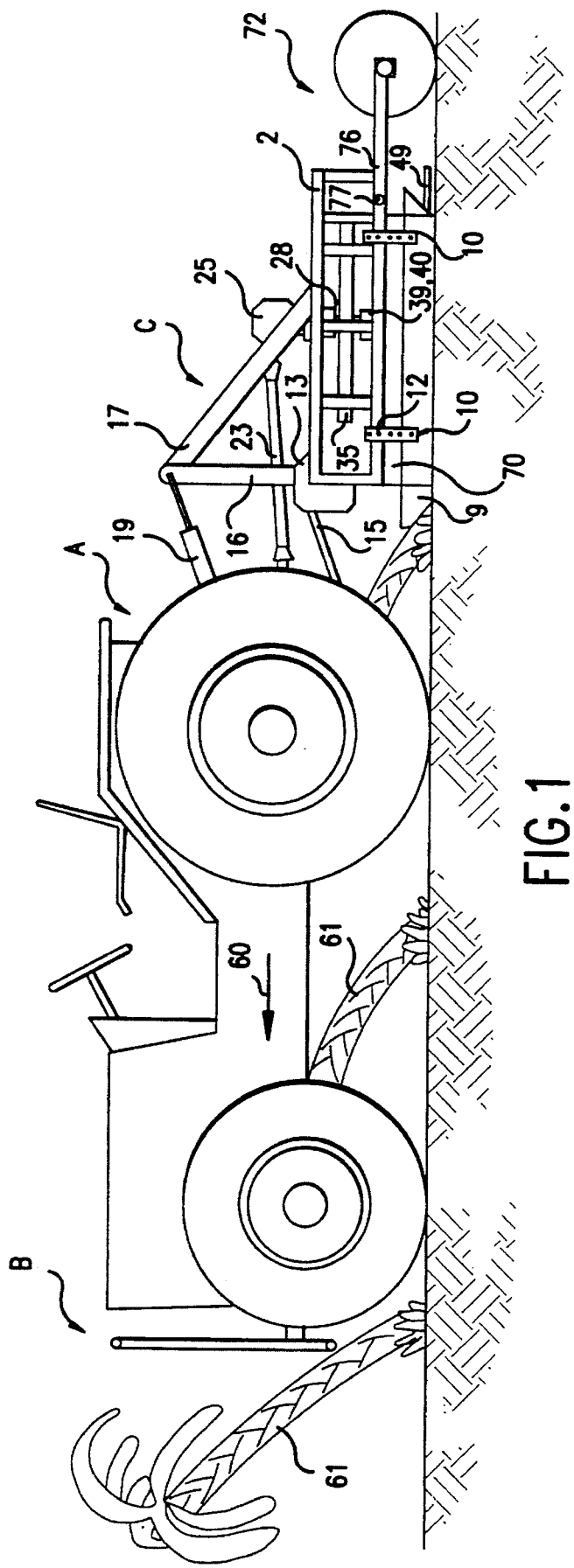
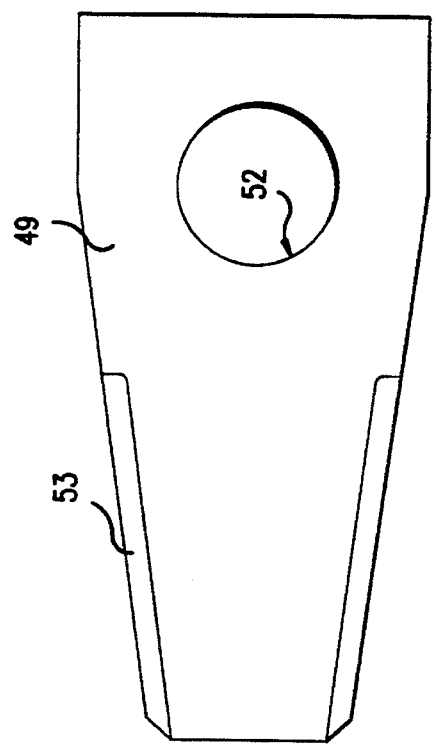
FIG. 1
FIG. 4

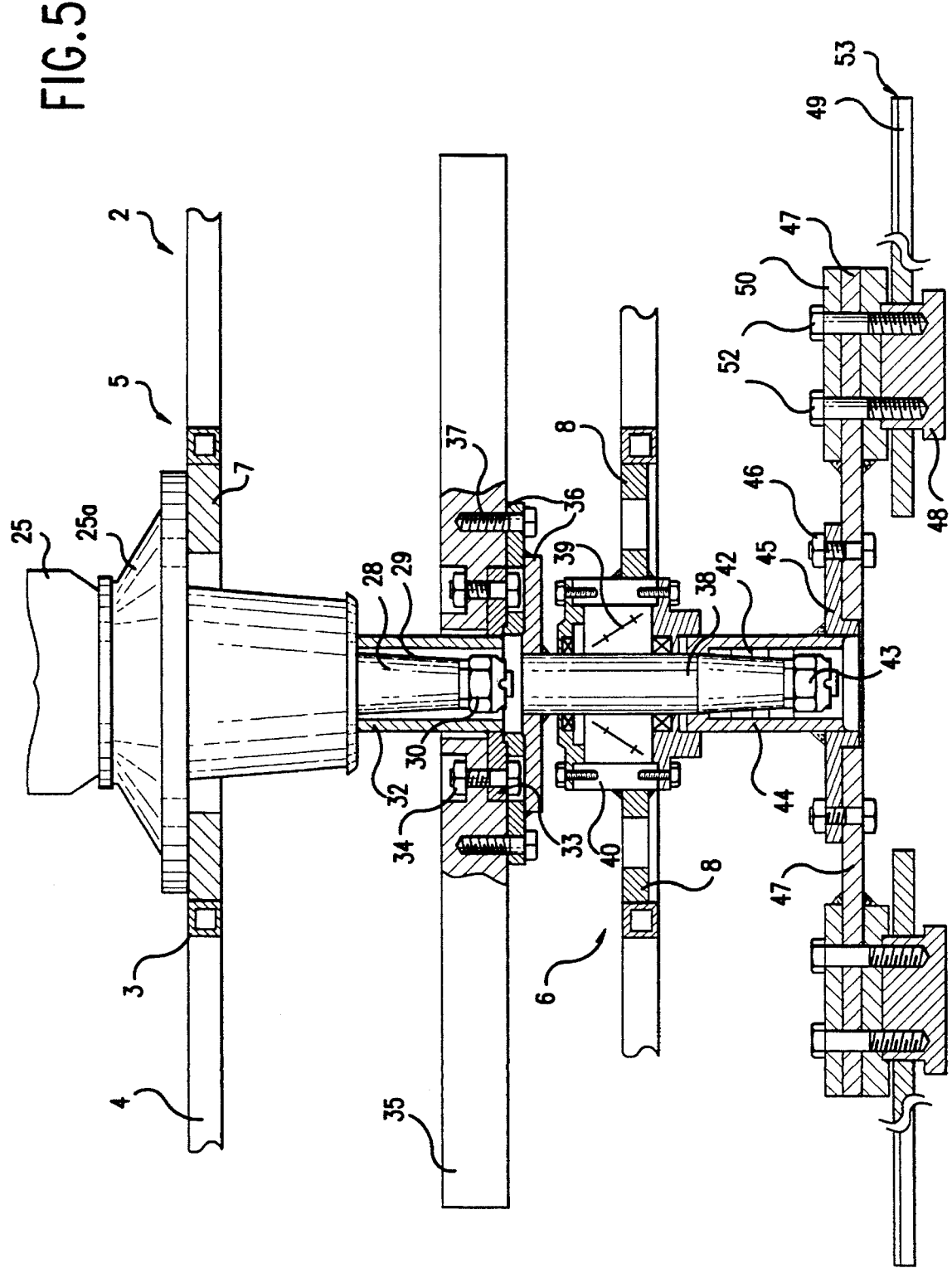

METHOD AND DEVICE FOR DESTROYING BANANA PLANTATION DEBRIS

This is a Continuation-In-Part of International Application No. PCT/FR93/00510 with an international filing date of May 25, 1993, now abandoned.

BACKGROUND OF THE INVENTION

After planting in a favorable, prepared soil, the numerous eyes that appear on the underground stem of the banana tree evolve into shoots, composed of long leaves. On selected shoots, the leaves overlap to form a false trunk between 1.5 and 8 m in length depending on the species of banana tree and culturing conditions.

After blooming, the bracts fall off one after another revealing the fruits or fingers which at that point hang downward. In the following months these fingers rise, curve, lengthen, and enlarge, forming hands connected to the stem of the banana bunch.

After the bunch has been picked, the false trunks are cut down because they can only blossom thereafter.

This operation marks the end of one production cycle and starts the next cycle.

During the last phase of the production cycle, several young shoots are selected from each stem by cutting. They ensure continuation of the crop.

In mechanizable plantations, for economic reasons linked to various factors, after a variable period of time the banana trees have to be destroyed and the land left fallow or replanted. The best plants are then selected and removed from the parcel to be replanted after preparation of the soil.

At the present time this soil preparation consists of chopping up the false trunks and other plant debris and burying them in the soil by means of heavy disk choppers that have to make four or five intersecting passes over the land to arrive at average results because the false trunks are difficult to chop and do not break down easily once they are in the soil.

The use of such machines compacts the soil because of weather conditions. Particularly with heavy rainfall, the soil is often very wet.

Moreover the water content of the debris, which is very high—on the order of 90%—associated with the quantity of debris buried, approximately 200 tons per hectare, creates a great deal of water which, added to the natural wetness of the soil, interferes with the later subsoiling operation rendered necessary by the compacting brought about by the disk choppers.

This subsoiling operation, performed by decompacting tools in several intersecting passes, rarely brings about the desired splitting and breakup of the compact areas, which breakup loosens up the soil, because when the teeth of the tools penetrate very wet soil they cause no breakup whatever.

Because of the above, present-day soil preparation techniques are unsatisfactory in terms of the quality of debris chopping and subsequent debris destruction as the means employed alter the structure of the soil, requiring additional steps of uncertain effectiveness.

SUMMARY OF THE INVENTION

One goal of the present invention is to remedy the situation by furnishing a self-propelled machine for destruction of banana plantation debris, which machine not only maintains the structure of the soil but also improves the breakdown of vegetable matter while reducing the number of passes and shortening preparation time.

This machine is of the type with an automotive chassis on wheels of which, for example, at least two are drive wheels and at least one is a steering wheel.

According to a first aspect of the present invention, there is provided a machine for cutting and mulching banana plantation debris, comprising an automotive chassis having a shield for pushing uncut false trunks, and a tunnel chassis connected to the automotive chassis, the tunnel chassis adjustably mounting a grinder to selected cutting planes; and a first shaft that is rotationally and vertically mounted on said tunnel chassis, a lower end of the first shaft mounting an inertial flywheel and a median part of the first shaft having a fixed bearing for an intermediate shaft that is coaxial with the first shaft, the intermediate shaft having an upper end rotationally connected to the inertial flywheel and a lower end connected to a circular plate that rotatably mounts at least two cutting blades.

According to a second aspect of the present invention, there is provided a machine for mulching agricultural debris. The machine includes a self-propelled tractor mechanism having a shield for initially contacting the debris as the tractor mechanism is driven, and a cutting assembly hitchable to the tractor mechanism. The cutter assembly houses blades powered with a power takeoff of the tractor mechanism. The blades are adapted to cut the debris at a first level that is above ground level, and a second level that is below ground level.

According to a third aspect of the present invention, there is provided a method of mulching agricultural debris with a tractor mechanism and a cutting assembly connected to the tractor mechanism. The method includes driving said tractor mechanism toward the debris thereby forcing the debris toward the cutting assembly, cutting the debris on a first level disposed above ground level with blades rotatably mounted on said cutting assembly; and mulching the debris on a second level disposed below the first level with the blades.

When the machine is operating, it has only to straddle a row of false trunks to push over the uncut false trunks by means of its shield, then, by means of the rear grinder, whose cutting plane is inclined rearward, it first bites into each false trunk with the anterior part of its cutting plane then shreds and chops the false trunks and all the debris lying on the soil by means of the posterior part of this cutting plane.

This operation is done in one pass and because of the low weight of the self-propelled machine, by comparison with heavy grinders, does not compact the soil.

Because of the inertial flywheel, which compensates for variations in the resistance torque with each bite into a false trunk, the drive means of the grinder operate at a substantially constant rate and may have a power corresponding to that of the tractors currently used, namely between 80 and 120 horsepower.

To this advantage, which allows traditional tractors to be used instead of heavy choppers with a higher hourly cost, is added the reduction in soil compaction due to the increased weight and elimination of many passes, and consequently protection of the structure of the soil.

Moreover, once the inertial grinder has passed, thus destroying the stems as far down as the blades engage the soil, a mulch is formed, namely a surface layer of finely ground debris. Once the debris has been plowed under, because of the presence of air in its voids, it breaks down under aerobic conditions, hence faster, thus favoring wetting of the soil and better transfer of colloidal humic complexes into the soil.

Because of the quality of the grinding obtained, soil preparation for the next harvesting cycle requires only superficial work with an ordinary plow that does not penetrate to the subsoil.

BRIEF DESCRIPTION OF THE DRAWINGS

Other characteristics and advantages will emerge from the description hereinbelow with reference to the attached schematic drawings showing two embodiments of the machine.

FIG. 1 is a partial side view in elevation showing a first embodiment of the machine in the working position in a row of banana trees, but with the tunnel chassis down;

FIG. 4 is a plane view from above showing, on an enlarged scale, one embodiment of a grinder blade;

FIG. 5 is a partial view in cross section showing, on a still further enlarged scale, the blade rotation drive means;

DETAILED DESCRIPTION OF PREFERRED EMBODIMENTS

The machine according to the invention is composed essentially of an automotive chassis designated in general by reference A and composed, in this embodiment, of a farm tractor, a front shield designated by B, and a rear grinding assembly or inertial grinder C.

Figure 6:
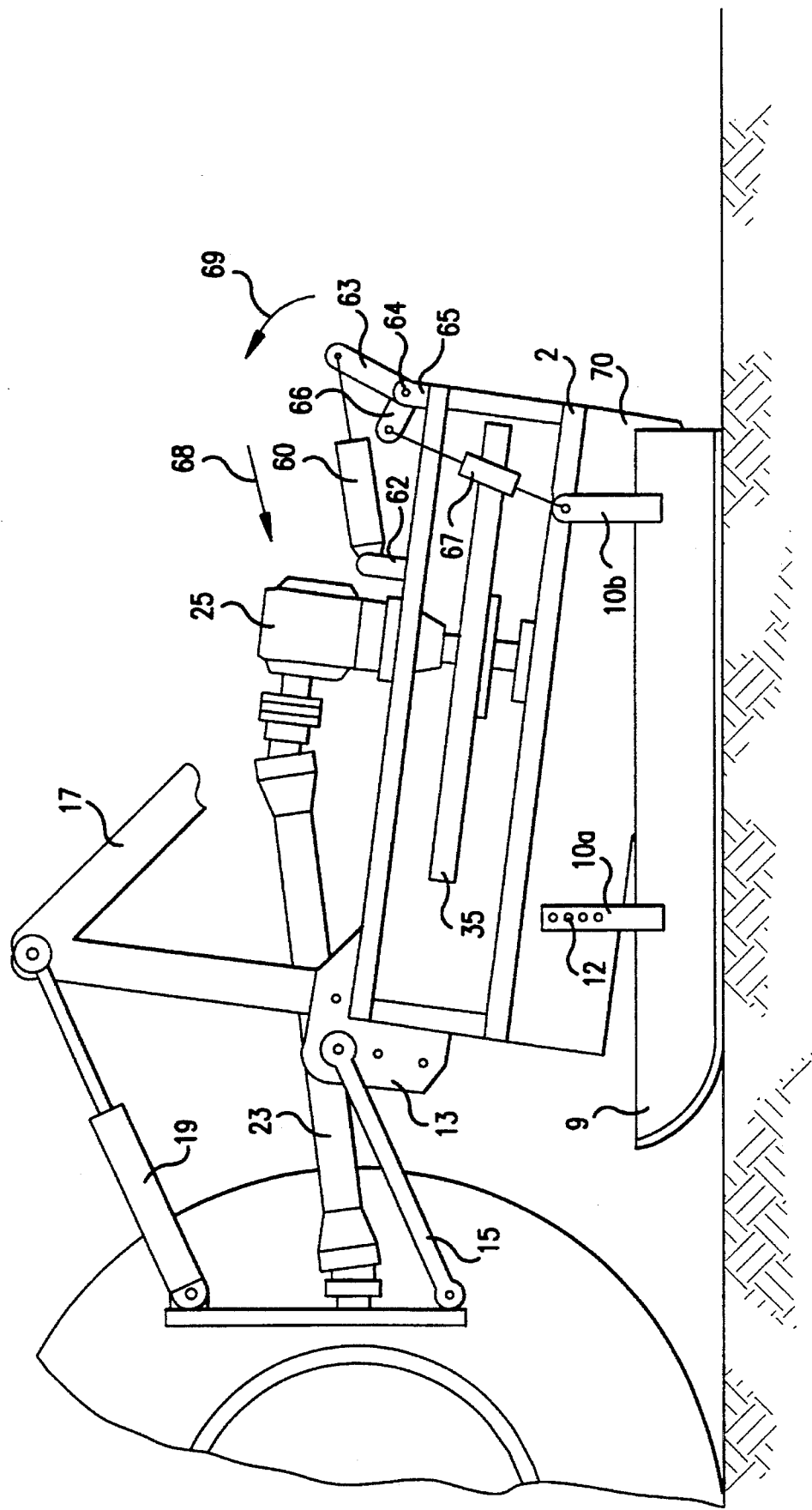
FIG. 6 is a side view, similar to FIG. 2, but showing an alternative embodiment of the tunnel chassis in elevation.
Figure 7:
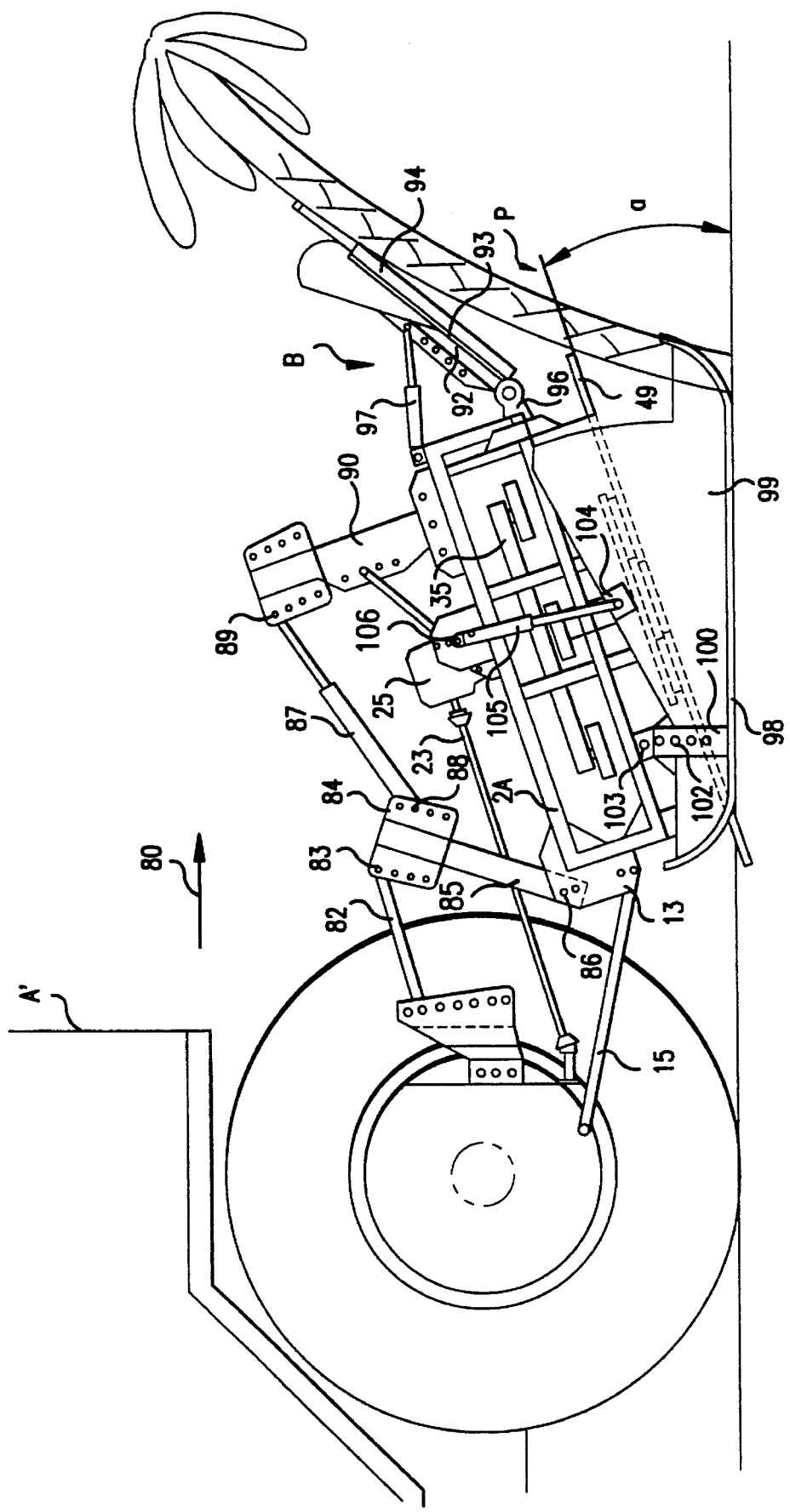
FIG. 7 is a partial side view of a second embodiment of the machine.
Figure 8:
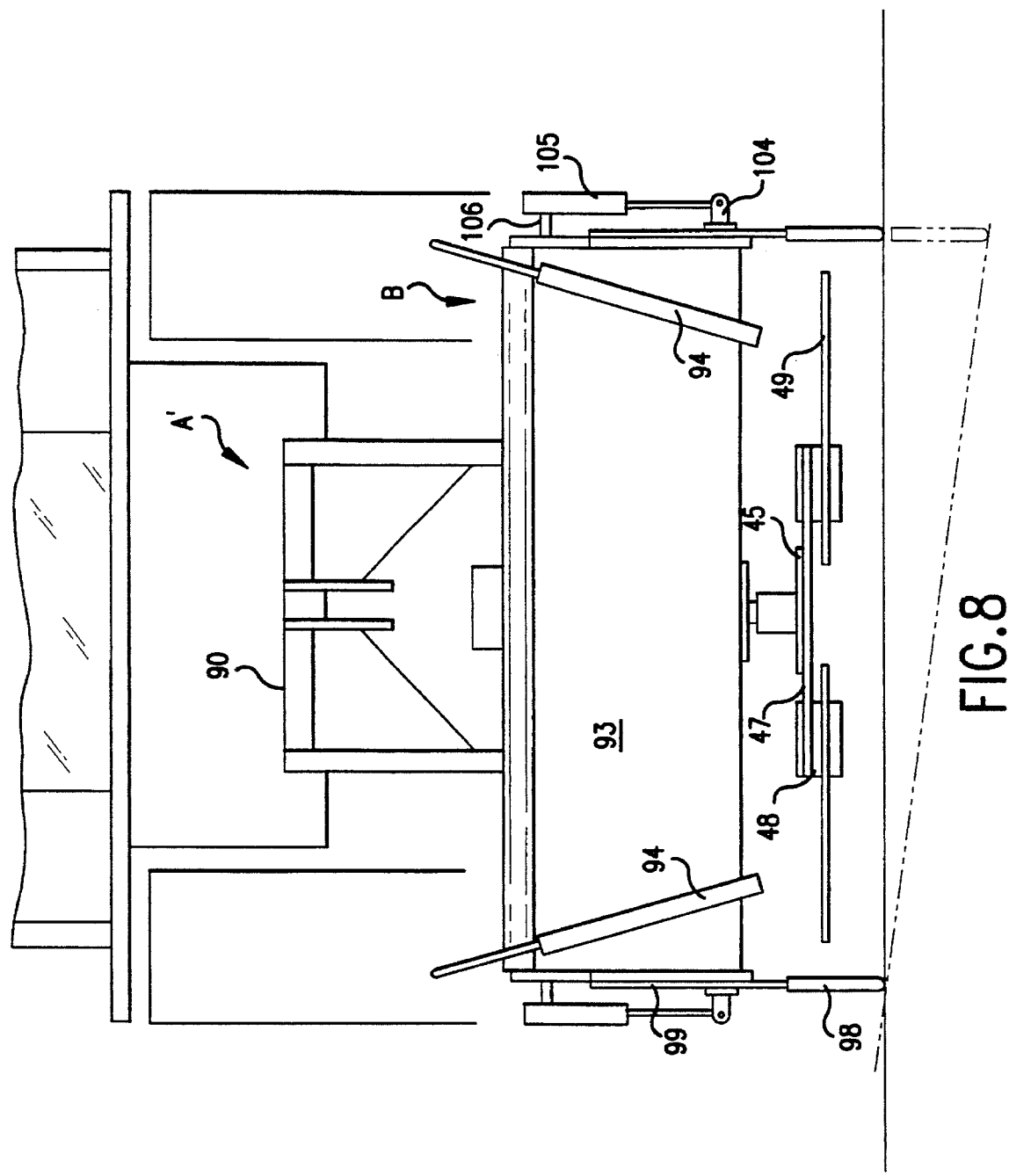
FIG. 8 is a front view of the machine in FIG. 7.

In the embodiment of FIGS. 1 to 6, the machine is operating in the normal direction of travel of the tractor, while in the embodiments of FIGS. 7 and 8 its direction of operation corresponds to reverse travel of the tractor.

Figure 2:
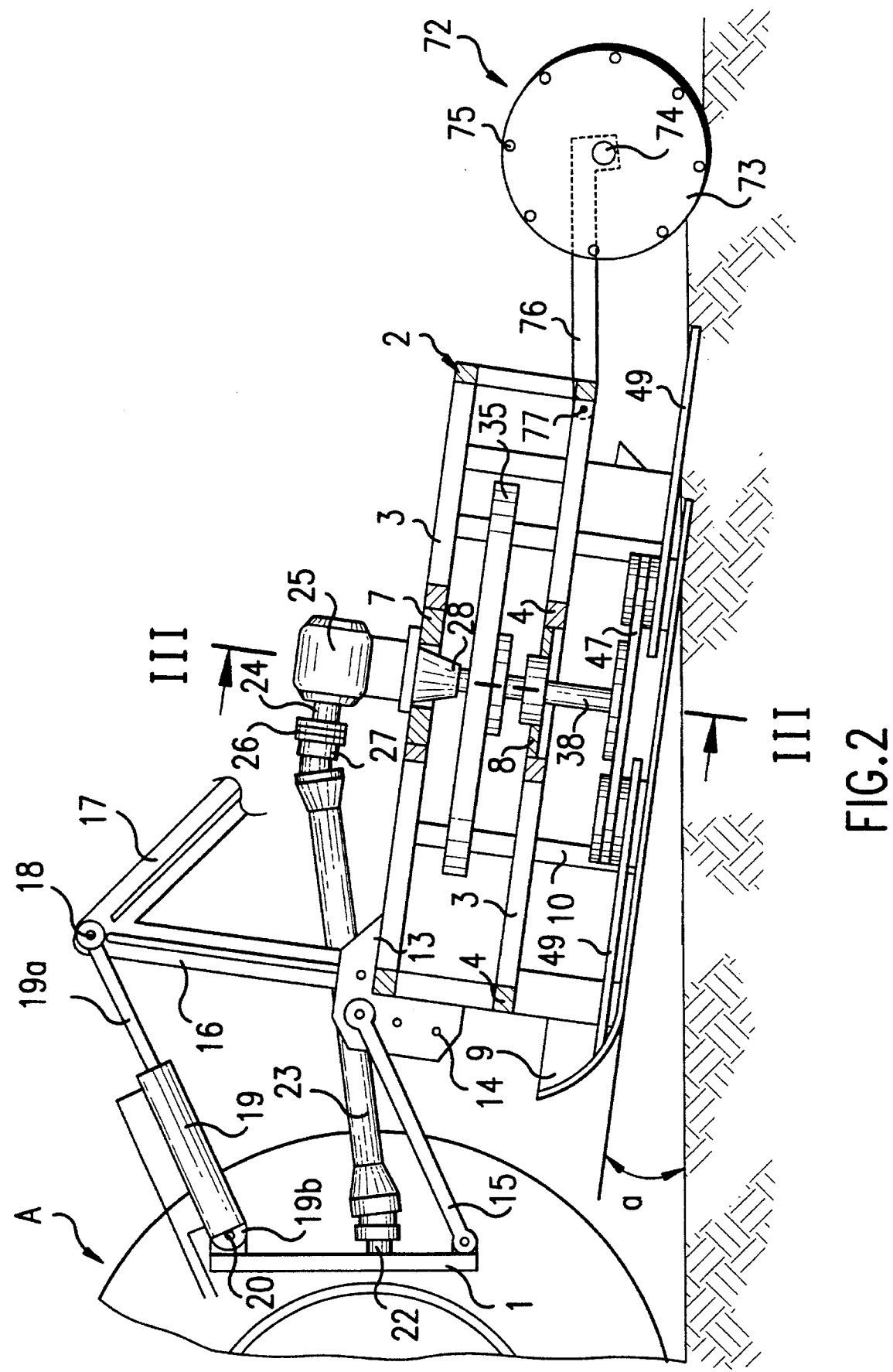
FIG. 2 is a partial view in partial section on an enlarged scale showing in greater detail an embodiment of the grinder located at the rear of the automotive chassis when it is in the working position.
Figure 3:
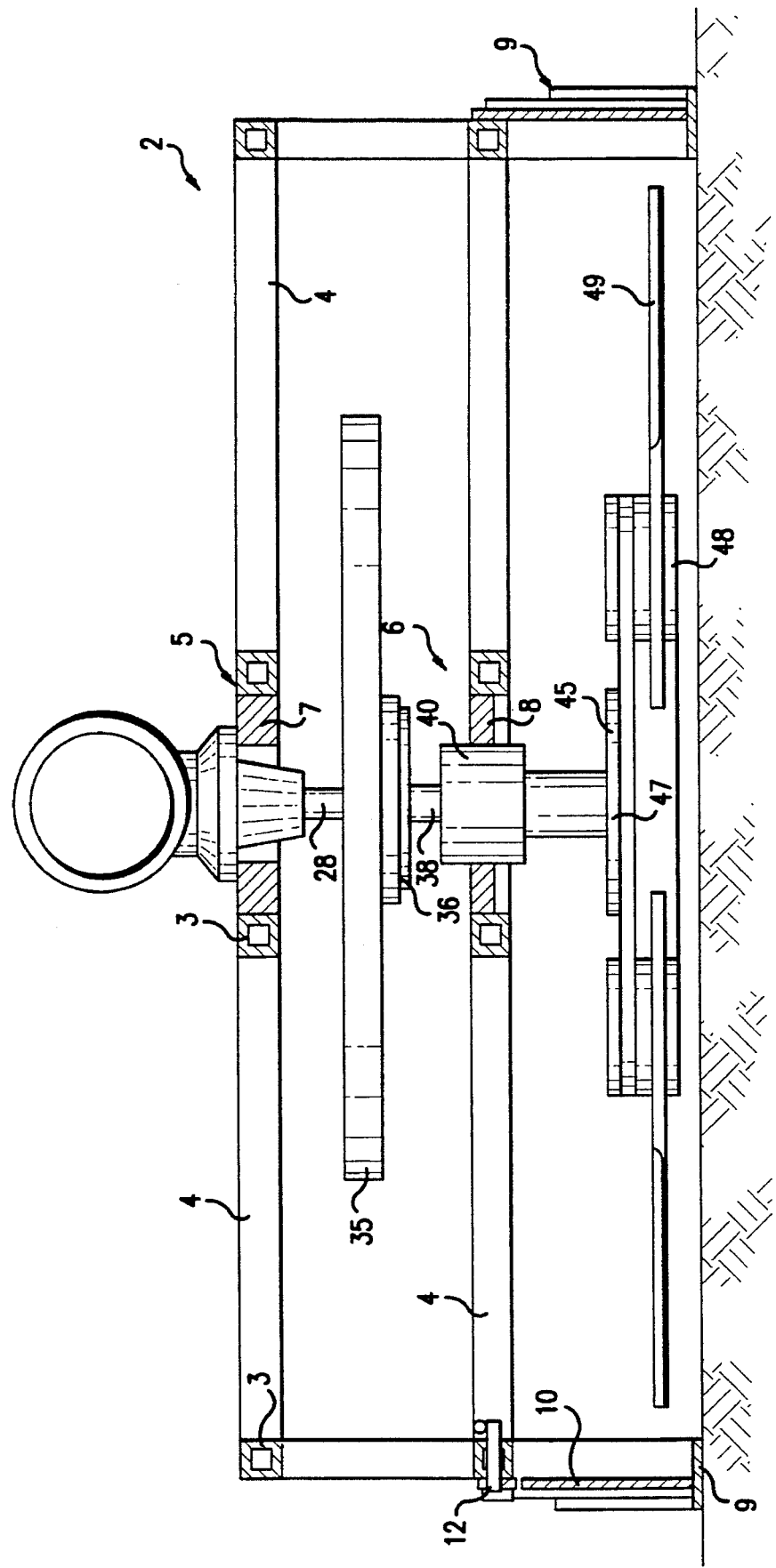
FIG. 3 is a cross section along line III—III in FIG. 2 showing on a still further enlarged scale the components of the grinder mounted in the tunnel chassis.

As shown in greater detail in FIGS. 2 and 3, the grinding assembly is itself composed of a tunnel chassis 2 with a cross section in the general shape of an upside-down U. Spars 3 and cross members 4 of this chassis delimit, in its central part, support frames, namely an upper support frame 5 and a median support frame 6 for an upper mounting plate 7 and median mounting plate 8 respectively, welded onto these frames. The chassis rests on the soil by means of two lengthwise skids 9 each of which is attached to the corresponding side of the chassis by risers 10. This attachment is ensured by means that allow the positions of the skids relative to the sides to be adjusted for example by transverse pins 12 that engage the bores of spars 3 and cooperate with one of the openings provided in each of risers 10.

At its front, upper part, tunnel chassis 2 is integral with two gussets 13 which have through openings 14 allowing them to be attached to the free ends of two lower lateral connecting rods 15 of hitch 1 of tractor A.

Tunnel chassis 2 also has two vertical risers 16 which, each reinforced by upper braces 17, are disposed on either side of its lengthwise vertical median plane and, at the upper part, have a bore for attaching a pin 18 that serves to connect rod 19a of a double-acting jack 19 whose body 19b is attached at 20 to the third rear hitching point of the tractor.

It can easily be seen that by feeding the chamber on the rod side 19a or the chamber on the piston side 19b of the jack it is possible easily to modify the inclination of chassis 2 and hence the cutting angle a of the grinder relative to the ground, and that it is possible to raise the tunnel chassis as a whole for example to clear a jam.

In this embodiment and as shown in greater detail in FIG. 2, rear power takeoff 22 of tractor A is connected by a telescoping shaft 23 with a double cardan joint to input shaft 24 of a differential 25 mounted on chassis 2. It is a step-up differential able to confer on its output shaft a speed of approximately 800 rpm at a constant speed of power takeoff 22 which, depending on the speed of the tractor power takeoff, is a step-up or step-down differential.

Advantageously, between telescoping shaft 23 and the aforementioned input shaft 24 are interposed both a torque limiter 26 and a ratchet mechanism 27 that allows transmission of motion only in the direction from telescoping shaft 23 to input shaft 24, thus opposing driving of shaft 23 by shaft 24.

As shown in greater detail in FIG. 5, the housing of differential 25 is attached by its base 25a to upper flange 7 of chassis 2. Output shaft 28 of the differential is essentially vertical. On this output shaft 28, a hub 32 integral with a crown 33 is rotationally wedged by a key 29 and translationally wedged by a castle nut 30. This crown serves to attach, by bolts 34, an inertial flywheel 35 with a weight between 350 and 500 kg depending on the type of plantation, namely the density of the vegetable matter to be ground.

FIG. 5 also shows that a flange 36 attached to inertial flywheel 35 by bolts 37 is integral with an intermediate shaft 38 located coaxially below the aforesaid output shaft 28. This intermediate shaft is mounted freely rotationally in at least one tapered roller bearing 39 disposed in a housing 40 attached to median flange 8 of chassis 2. The frustroconical lower end of shaft 38 is connected rotationally by a key 42 and translationally by a castle nut 43 to hub 44 by a mounting flange 45.

Finally, a crown-shaped circular plate 47 is attached by bolts 46 to flange 45, which plate has at least two pivots 48 for cutting blades 49. The two pivots are attached in the vicinity of the periphery of plate 47 and are diametrically opposed on either side of its axis of rotation. Each of them is composed of a cylindrical core with a large diameter, approximately 110 mm, and is attached by vertical bolts 52 to a part of the plate reinforced by plates 50.

As shown in greater detail in FIG. 4, each of blades 9 has a generally trapezoidal shape and has, in its wider part, a hole 52 of the same (allowing for play) diameter, as that of pivots 48 and, on its lengthwise edges, cutting parts 53. These blades are free to rotate and can thus yield if they encounter excessive resistance. They are removable, replaceable, and reversible.

In operation, as shown in FIG. 1, the machine according to the invention, in this case tractor A, moves in the direction of arrow 60 straddling a row of false trunks 61. During this movement, its front shield B, composed of an assembly of tubes, which may or may not be reinforced by a metal panel, pushes the uncut false trunks down to the ground. After the tractor has passed over them, the false trunks are surmounted by tunnel chassis 2 which is then in the position shown in FIG. 2, namely it is inclined rearward by an angle a between 5° and 15°, depending on the type of plantation, so that the circular trajectory of cutting blades 49 cuts into the soil.

With this arrangement, because of the kinetic energy communicated to the blades by plate 47, they first bite into the false trunks with the raised anterior part of their cutting plane, then with the posterior part thereof, very easily shredding the plant matter lying on the ground and the underground part of the banana tree.

During this operation, the resistive force they encounter when biting into each false trunk is compensated by the kinetic energy that builds up in inertial flywheel 35, which allows the desired shredding to take place without any significant drop in the speed of the thermal engine of the tractor.

It should be noted here that if the resistive force is particularly high and tends considerably to reduce the rotational speed of the rotating assembly, this has no effect on telescoping shaft 23 and hence on the thermal engine or transmission of the tractor because of torque limiter 26 that then begins to slip, ensuring separation between the resistive torque and the engine torque. Conversely, if in operation the engine drops in speed or stalls while the grinder continues its rotational movement under the influence of the kinetic energy built up in flywheel 35, the movement of this flywheel is not transmitted to the engine because of the presence of ratchet mechanism 27.

It emerges from the foregoing that as the machine advances according to the invention above a row of false banana tree trunks, it shreds all the elements passing under its tunnel chassis 2 and leaves behind it a mulch of finely ground plant products which extends over the surface or is buried to the depth of the blade action in the soil.

It is evident that in the case of jamming, namely when the quantity of plant matter to be shredded is greater than the capacity of the grinder at a given instant, the operator seated on the tractor can, by stopping the forward movement of the tractor, raise the chassis to reduce the thickness that is to be shredded. Of course this operation requires the operator to back up and make a new pass until the desired shredding is achieved.

In the embodiment of FIGS. 1 to 5, this operation is effected by activating jack 19 and means that, after the jam has been cleared, the tunnel chassis must be repositioned angularly.

To remedy this, the alternative embodiment shown in FIG. 6 has means allowing tunnel chassis 2 to be straightened up to reduce the cutting angle and bring the blades into an upper horizontal position without having to activate lifting jack 19.

These means are composed of a double-acting hydraulic jack 60 which, disposed above chassis 2 and essentially in the median plane thereof, is articulated at one end in a clevis 62 of this chassis and on the other side at the end of a lever 63 joined to a transverse shaft 64. Shaft 64 is mounted freely rotationally in bearings 65 and has levers 66 joined to each of its ends that extend beyond chassis 2. Each lever is connected by a connecting rod 67 of variable length to the rear riser 10b of chassis 2. Finally, each of front risers 10 is linked to chassis 2 only by a single pin 12 forming an axis by which the skids pivot on the chassis.

When the grinder is in a jammed condition, namely it has difficulty in shredding the plant matter and its rotational speed has slowed, the tractor driver activates jack 60 in the direction of arrow 68, namely in its retraction direction. As a result, lever 63, shaft 64, and levers 66 pivot in the direction of arrow 69 and the reaction on rods 67, already resting on the soil through risers 10b, by rotation around pins 12 causes the rear part of tunnel chassis 2 to rise. This movement returns to the horizontal the tilt angle of blades 49 of the grinder and reduces the degree of grinding action, hence decreasing the resistance.

This maneuver is effected with no need to act on jack 19 so that after the tractor has backed up, the cutting angle of the grinder is adjusted, namely returned to the normal cutting position, only by jack 60, by means of a valve graduated or provided with marks to visualize the optimum working position.

It should be noted that, because of the structure, the cutting means, and particularly the shape of the plate and the mounting of the blades, there is little likelihood that the stringy parts of plants or leaves will tangle around them so that they will retain their efficiency whatever the density of the vegetation.

To improve the safety of personnel working on this machine, particularly to prevent stones or plant debris from being ejected out of the tunnel chassis, the latter is associated on the sides with pieces of sheet metal 70 and at the rear with a protective roller 72 visible in FIGS. 1 and 2. This roller is composed of two circular wheel flanges 73 forming wheels and connected to each other both by an axial shaft 74 and by rods 75. Shaft 74 is mounted freely rotationally by each of its ends to the rear ends of two levers 76 articulated by their front ends and at 77, to the rear of tunnel chassis 2.

Tests conducted with a machine according to the invention have shown that, by comparison with the solutions used to date, it allows the following:

extremely fine chopping of debris, destroying the plant parts buried in the soil because of the angle of the cutting plane relative to the ground, operating the tractor engine at constant speed without demanding acceleration as it passes over denser clumps of vegetation, not degrading the structure of the soil by compaction or smoothing, as is the case with the present-day grinders, and in particular replacing the numerous passes over the soil, namely four intersecting passes for the grinders and two intersecting passes for the subsoiling operation, by a single pass of the destruction machine followed by a single pass of an ordinary plow, namely without causing any change in the deep structure of the soil.

In one alternative embodiment, not shown, differential 25 is replaced by a hydraulic motor whose output shaft is connected in the same way as shaft 28 to flywheel 35 and which is supplied with power by a hydraulic pump driven by the thermal engine of the self-propelled chassis. Except for these differences relating to the rotational drive of the grinder, all the other grinder elements are identical so that the cutting action of blades 49 benefits from the kinetic energy of flywheel 35.

It is obvious that the automotive chassis, described as being a traditional multipurpose tractor, with at least two drive wheels and at least one steering wheel, can be replaced by a specific automotive chassis.

The embodiment represented in FIGS. 7 and 8 is differentiated from the preceding embodiment by the direction of operation, represented by arrow 80 in FIG. 7, by the position and structure of shield B, by the means by which its inclination is adjusted, and by the means by which its skids are adjusted.

Such a tunnel chassis is applicable to a tractor A' having a reversible cab allowing continuous operation in a direction corresponding to rearward motion of the tractor. Attachment of chassis 2a to the rear of the tractor is differentiated from the attachment of the previous machine in that jack 19 is replaced by the traditional tie rod 82 of the three-point hitch of the tractor, and in that this tie rod is not articulated directly to the chassis, but at 83 on an attachment plate 84, itself attached to the upper end of a rigid frame 85 articulated at 86 to gussets 13 of this chassis.

The grinder inclination adjustment means is comprised of a single hydraulic jack 87 whose body is articulated at 88 to plate 84 and whose rod is articulated at 89 at the upper end and in the middle of a frame 90. The risers of this frame are attached to the end of tunnel chassis 2a rigidly but adjustably. This arrangement confers on chassis 2a, and consequently on cutting plane P, an angle of inclination a with a value between 0° and 60°, and in general on the order of 30° to 35°, as a function of the plantation characteristics.

In the case of jamming when the machine is advancing, this allows the resistance to be reduced by raising the entire grinder by means of the tractor raising device, thus without acting on the means that adjust the inclination of this grinder. Hence, when the grinding assembly is brought into the working position, the inclination of the cutting plane is retained and requires no adjustment.

Shield B is formed by a structure 92 bearing a transverse wall 93 from which project two telescopic spurs 94.

FIG. 8 indeed shows that these spurs are disposed near the edges of wall 93 such that they form a "V" that converges from the outside to the inside of the tunnel chassis. This shield is articulated at 95 on a horizontal transverse shaft borne by bearings 96 that project from the tunnel chassis.

This structure 92 is connected, by at least one hydraulic jack 97, to the upper part of tunnel chassis 2a. This jack 97 allows adjustment, from the cab, of the inclination of the shield to adapt it to the height of the vegetation and specifically to give it a position allowing it to tilt the false trunks just before they are attacked by the grinder blades, as shown in FIG. 7.

Finally, skids 98 are integral with flanges 99 which constitute a protective screen by limiting lateral scattering. Each of the flanges has a vertical riser 100 which, via a pin 102, is articulated to a perforated riser 103 of the chassis and a clevis 104 to which is articulated the rod of a jack 105 whose body is articulated at 106 to the chassis.

The two hydraulic circuits ending at the two lateral jacks 105 are connected to a control center that controls their movement such that, whatever the configuration of the ground, skids 98 are always resting on the ground to make the best use of the protective-screen function of flanges 99, and to participate in the support of tunnel chassis 2a.

It is obvious that the grinding assembly just described has the same blade-carrying plate with inertial flywheel as in the previous embodiment and the same rotary drive means composed either of a telescopic shaft 23 connected to the power takeoff of the tractor or by a hydraulic motor not shown.

The latter embodiment allows a greater inclination to be given to cutting plane P while facilitating control by the operator of the grinding and plowing-under operations and improving the safety of the personnel around the machine.

Obviously the machine according to the invention, described in the context of application to destruction of banana plantation debris, could also be used for destroying any other plant crop, for example pineapple crops.

The invention has been described in detail with reference to preferred embodiments thereof, which are intended to be illustrative, not limiting. Various modifications can be made without departing from the spirit and scope of the invention, as set forth in the appended claims.

I claim:

1. A machine for cutting and mulching banana plantation debris, comprising:

an automotive chassis having a shield for pushing uncut false trunks, and a tunnel chassis connected to the automotive chassis, the tunnel chassis adjustably mounting a grinder to selected cutting planes; and a first shaft that is rotationally and vertically mounted on said tunnel chassis, a lower end of the first shaft mounting an inertial flywheel part of, the first shaft having a fixed bearing for an intermediate shaft that is coaxial with the first shaft, said intermediate shaft having an upper end rotationally connected to the inertial flywheel and a lower end connected to a circular plate that rotatably mounts at least two cutting blades.

2. The machine according to claim 1, wherein the automotive chassis comprises a tractor having two lower lateral connecting rods, each of said lateral connecting rods being connected to a gusset formed on the tunnel chassis, the tractor having an upper central hitching point connected to a hitching pin of the tunnel chassis by a double-acting hydraulic jack.

3. The machine according to claim 2 further comprising a power takeoff provided for the tractor, said power takeoff being connected to an input shaft of a step-up differential by a telescoping transmission shaft having double cardan joints, said telescoping transmission and said differential having torque limiting means and a ratchet mechanism disposed therebetween for allowing transmission of movement only in a power-takeoff-to-differential direction.

4. The machine according to claim 1 further comprising drive means for driving the inertial flywheel, said drive means comprising a hydraulic engine powered by a hydraulic pump mounted on the automotive chassis and driven by a thermal engine of the automotive chassis.

5. The machine according to claim 1 wherein the tunnel chassis is associated with a towed roller for protection against ejected matter, the towed roller having a horizontal shaft rotatably mounted to articulated levers, said articulated levers being rotatably mounted to a rear of the tunnel chassis.

6. The machine according to claim 1 wherein the tunnel chassis is provided with lengthwise skids, each said skid being provided with at least two risers positioned on spars of the tunnel chassis by removable transverse pins passing through openings on the spars.

7. The machine according to claim 1 wherein the tunnel chassis is provided with lengthwise skids that rest on the ground, each said skid being provided with a perforated anterior riser articulatable about a removable transverse pin, said pin being attached to a bearing of the tunnel chassis and passing through respective openings in the anterior riser, and a posterior riser being connected to means for adjusting a position of the skid relative to the tunnel chassis.

8. The machine according to claim 7 wherein the means for adjusting the skid includes means for determining the cutting angle of the grinder, said means for determining including a double-acting hydraulic jack having a first end articulated on a clevis on the tunnel chassis and a second end articulated on a first lever joined to a transverse shaft, a second lever joined to the transverse shaft that projects beyond the tunnel chassis and two connecting rods having first ends connecting to said second lever and second ends connected to the posterior riser.

9. The machine according to claim 1, wherein the automotive chassis includes at least two drive wheels and at least one steerable wheel.

10. The machine according to claim 1, wherein the tunnel chassis has a generally upside down U-shape cross-section.

11. The machine of claim 1, wherein the tunnel chassis is hitched behind a farm tractor having a reversible cab for controlling movements in both directions, while the shield is at an adjustable inclination and is articulated to the edge of tunnel chassis which is in front of it relative to the direction of operation corresponding to movement of the tractor in reverse.

12. The machine of claim 11, wherein a central, upper hitching tie rod of a three-point hitch of the tractor is articulated to an attachment plate which, attached to a frame articulated to one end of tunnel chassis, also has at least one bore for articulation of the body of a hydraulic jack for adjustment of an inclination of the tunnel chassis, the rod of said jack being articulated to another frame projecting from the other end of the tunnel chassis.

13. The machine of claim 11 wherein the shield has a transverse wall from which project two lateral guide spurs disposed thereon forming a V-shape that converges in the direction of the grinder.

14. The machine of claim 11, wherein the shield is articulated to tunnel chassis to which it is connected by at least one hydraulic jack for adjusting its inclination.

15. A machine for mulching agricultural debris, comprising:

a self-propelled tractor mechanism having a power takeoff;

a cutting assembly having a power transmission element powered by said power takeoff, said cutter assembly housing blades being powered with said power takeoff of said tractor mechanism, said blades being adapted to cut said debris at a first level that is above ground level, and a second level that is below ground level;

an inertial flywheel provided to said cutting assembly for compensating resistive force encountered by the blades during cutting; and an assembly for communicating the power transmission element and the blade, said assembly including an output shaft connected to the power transmission element and an intermediate shaft disposed coaxial to said output shaft, an end of each of said output shaft and said intermediate shaft being connected to said inertial flywheel.

16. The machine of claim 15, wherein the cutting assembly is provided with a pair of skids that slide across ground level as the tractor mechanism is driven.

17. The machine of claim 16, further comprising means for adjustably mounting the skids with respect to the cutting mechanism such that a cutting angle of the blades can be changed with respect to ground level.

18. The machine of claim 15, further comprising a drive train for powering said blades, said drive train including a double-cardan telescoped shaft having one end connected to the power takeoff and another end connected to said power transmission elements.

19. The machine of claim 15, further comprising a torque limiter and ratchet mechanism disposed between the differential and the telescoping shaft.

20. A method of mulching agricultural debris using a tractor mechanism having a power takeoff and a cutting assembly connected to the tractor mechanism, the method comprising:

driving said tractor mechanism toward said debris thereby forcing said debris toward the cutting assembly;

the cutting assembly comprising an inertial flywheel coupled to the cutting assembly via an intermediate shaft, said inertial flywheel including an output shaft, coaxial with the intermediate shaft, that provides said inertial flywheel with rotative power;

powering said cutting assembly and said inertial flywheel with a power transmission element coupled with said power takeoff provided on said tractor mechanism;

cutting the debris on a first level disposed above ground level with blades rotatably mounted on said cutting assembly; and mulching the debris on a second level disposed below said first level with said blades.

21. The method of claim 20, further comprising mounting the cutting assembly on a pair of longitudinal skids, and adjusting the cutting assembly with respect to the skids such that the blades of the cutting assembly are set to an angle between about 5°–15° with respect to ground level.

22. A machine for cutting and mulching banana plantation debris, comprising an automotive chassis having a shield for pushing uncut false trunk, and a tunnel chassis connected to the automotive chassis, the tunnel chassis adjustably mounting a cutting mechanism to selected cutting planes, said tunnel chassis including:

an output shaft rotationally and vertically mounted on said tunnel chassis, a lower end of the output shaft mounting an inertial flywheel, a fixed bearing disposed below said output shaft, and an intermediate shaft connected with the fixed bearing and coaxial with the output shaft, said intermediate shaft having an upper end rotationally connected to the inertial flywheel and a lower end connected to a circular plate that rotatably mounts said cutting mechanism.

* * * * *